M. LACHMAN.
PIPE OR CULVERT.
APPLICATION FILED FEB. 27, 1911.
1,043,944.
Patented Nov. 12, 1912.
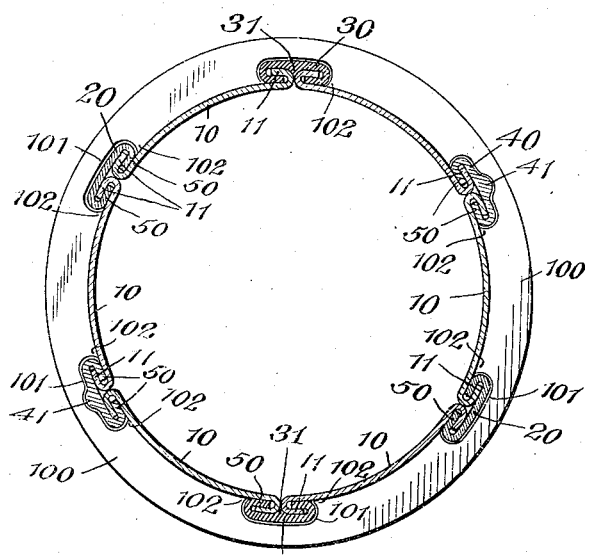
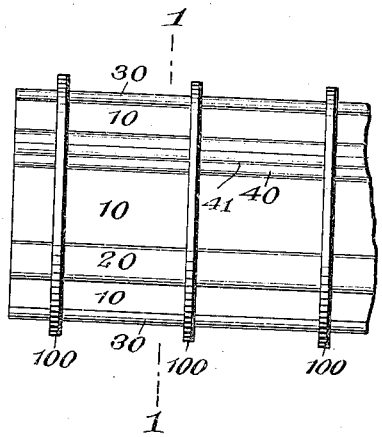
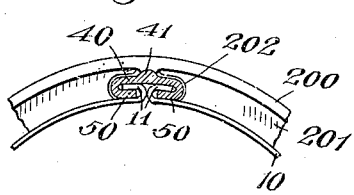
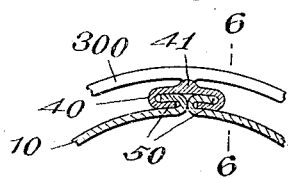
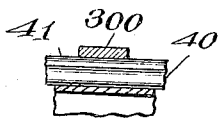
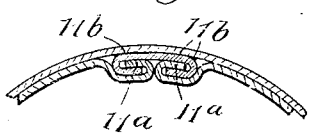
WITNESSES
INVENTOR
M. Lachman
BY
ATTORNEY

UNITED STATES PATENT OFFICE.

MAURICE LACHMAN, OF NEW YORK, N. Y.

PIPE OR CULVERT.

1,043,944.

Specification of Letters Patent. Patented Nov. 12, 1912.

Application filed February 27, 1911. Serial No. 611,197.

*To all whom it may concern:*

Be it known that I, MAURICE LACHMAN, a citizen of the United States, and a resident of the city, county, and State of New York, have invented certain new and useful Improvements in Pipes or Culverts, of which the following is a specification.

This invention has relation to pipes for use as culverts or for other purposes and it consists in certain peculiarities in the construction thereof substantially as hereinafter described and particularly pointed out in the subjoined claims.

The object of the invention is to provide a pipe or culvert of construction such that it may be economically produced and made in sections greater than heretofore and which will be tight and rigid. This object and others which will hereinafter appear, are accomplished by the constructions shown in the accompanying drawings illustrative of various specifically different embodiments contemplated to be within the spirit of the invention and the scope of the subjoined claims.

In said drawings: Figure 1 is a transverse section on the plane of line 1—1 of Fig. 2. Fig. 2 is a plan or elevation of a cylindrical pipe or culvert, on a smaller scale than Fig. 1. Fig. 3 is a detail representation showing a desirable form of the parts at one of the joints. Fig. 4 is a detail representation of one form of band or collar which may be employed. Fig. 5 is a detail representation showing a different form of band or collar which may be employed. Fig. 6 is a section on the line 6—6 of Fig. 5. Fig. 7 is a detail representation of a modified arrangement of parts at the joint.

Similar characters of reference designate corresponding parts in the several views.

In a general way it may be stated, that the pipe or culvert of the present invention has its body composed of a series of sections with longitudinal reverted or flanged edges which are locked together by clips or bars which engage the flanges, the bars being held against displacement and the body of the pipe being braced by bands or collars which encircle the same. These sections are of curved or plane shape as desired, according to the shape of the pipe or culvert whose bodies they form. The pipe or culvert may be of any suitable cross-sectional shape, cylindrical being herein illustrated as an example. The body sections are comparatively long and narrow, it being, in fact, an important purpose of the present invention so to construct and combine the parts that a section of a pipe or culvert of a length and diameter which is not practicable with previous constructions may be economically produced and successfully used.

Sections of pipes or culverts, produced according to the present invention, may be fifty or more feet in length, and without cross-joints.

Referring to Figs. 1 and 2 each of the longitudinal body-sections is marked 10 and its flanged ends are marked 11, 11. These body-sections may be of any suitable length and in this particular exemplification they are of shape such that six of them will form a cylinder, this being a desirable number of sections of which to produce such form. Their flanges are turned back approximately into a plane parallel with that of the body. The contiguous flanges of each two adjacent body-sections are engaged with and locked together by a clip or bar which extends longitudinally of the pipe or culvert from end to end thereof. Three different exemplary forms of these clips or bars are shown in Fig. 1. One form, marked 20 has its body formed with plane inner and outer walls. Another form, marked 30, has its inner wall formed with a longitudinal protuberance or projection, marked 31, which occupies the space between the diverging portions of the flanges 11 and closes said space, thereby making a tighter joint than the preceding form. The third form, marked 40, differs from the form marked 20 in that its outer surface is provided with a longitudinal rib, or a series of protuberances, marked 41, whose purpose will hereinafter appear. Each of these clips comprises inwardly bent ends, marked 50 in all of the figures, which are spaced from the inner wall of its body and interlock with the flanges 11 of the body-sections 10. In practice the body-sections 10 are rolled in long lengths, and then the selected clips are slipped on longitudinally as the flanges 11 are being turned and they are then pressed together, to form a pipe having the elements described. Either before or after the pressure operation just described, whichever is preferred, the hereinbefore referred to bands or collars are forced onto the body of the pipe or culvert into a proper spaced relation with each other. Different exemplary forms of these bands or collars are shown. One form, marked 100 in Figs. 1 and 2 comprises a body, of plane form, having its inner edge formed at intervals with a series of apertures, 101, whose shape, position and number corresponds to the shape, position and number of the clips. This ring has its inner edge engaged with the outer surface of the body-sections 10. Its apertures are each so shaped as to provide inward projections 102, which extend under the clips. By this construction any lateral displacement of the clips is prevented, the wall of the pipe is braced and any tendency of the seams to open is effectively prevented. The ring or band indicated in Fig. 4 and marked 200 is of T-bar form. Its web, 201, is provided at intervals with apertures 202 for receiving the clips. Its outer flange 203 overlies the outer walls of the clips. This is a very effective construction, and moreover is desirable in that its outer flange enables it to be readily and economically secured to the clip by electric welds. For the latter purpose some or all of the clips on a pipe are preferably of the form shown at 40, the protuberances or longitudinal projections 41 of the latter forming projections through which the weld may be most satisfactorily and economically produced. It will be understood that this projecting part of the clip may be continuous or that the clip may be formed with separated projections spaced apart at distances corresponding to those of the rings.

In Fig. 5 the ring or band, marked 300, is of simple hoop form. This ring may be welded to one or more of the clips, as indicated in Fig. 5. In this figure the ring will not make contact with the outer surface of the body-sections, but there is shown in Fig. 7 a correlation of parts whereby a ring or band of simple hoop form is in contact with the outer surface of the body-sections. In this form the ends of the body-sections are turned inward a distance such that the upper, reverted members of their flanges, marked 11ª, will lie sufficiently below the upper surfaces of the main portions of said sections to permit the clips to be in the plane or arc of said upper surfaces of the latter. In other words, the ends of the body-sections are turned down so as to form pockets which accommodate the clips, whereby a plane surface ring or band of hoop form will span said pockets and will be in contact with the outer surfaces of the clips and with the outer surfaces of the body-sections. This band is secured to the clips by electric welds, at 11ᵇ.

While welding projections are desirable they are not altogether essential.

In all of the preceding forms the pipe or culvert is of cylindrical form, but this is not essential, as the invention may be embodied in many different shapes without departing from its spirit or the scope of the subjoined claims.

While I have shown the longitudinal clips on the outside of the pipe or culvert, yet it is to be understood that the parts forming the same may be so constructed that the clips may be on the inside of the pipe or culvert.

Having thus described the invention what is believed to be new and desired to be secured by Letters Patent, is:

1. A pipe or culvert comprising body-sections whose longitudinal edges are formed with reverted flanges, bars or clips, which connect the flanges of adjacent body sections with each other and have their longitudinal edges provided with inwardly extending flanges which underlie the reverted portions of the body-sections, said bars or clips also having inwardly-extending projections which fill the spaces between the diverging portions of the flanges of the body sections.

2. A pipe or culvert comprising body sections having flanged or reverted longitudinal edges, clips or bars extending longitudinally of the pipe or culvert and receiving the flanges of the latter and locking said flanges together, and bands extending around the pipe or culvert, at intervals along the length of the latter, and engaging the clips or bars.

3. A pipe or culvert comprising body-sections having flanged or reverted longitudinal edges, clips or bars extending longitudinally of the pipe or culvert and receiving the flanges of the latter and locking said flanges together, and bands extending around the pipe or culvert, at intervals along the length of the latter, and engaging the clips or bars, and integrally united to some of the latter.

4. A pipe or culvert comprising body-sections whose longitudinal edges are flanged, bars or clips engaging the flanges and connecting adjacent sections to each other, and bands extending around the pipe or culvert, at intervals along the length of the latter, and having apertures which accommodate the clips or bars.

5. A pipe or culvert, comprising body-sections having flanged longitudinal edges, clips or bars which engage the flanges of adjacent body-sections and connect the same with each other, and bands which extend around the pipe or culvert, at intervals along the length of the latter, and are formed with apertures which accommodate the clips or bars, the mouths of said apertures being formed with inward projections which underlie parts of the clips or bars.

6. A pipe or culvert comprising body-sections having flanged longitudinal edges, clips or bars which engage the flanges of adjacent body-sections and connect the same with each other, and bands which extend around the pipe or culvert, at intervals along the length of the latter, and are formed with apertures which accommodate the clips or bars, the inner edges of the bands engaging the outer surfaces of the body sections.

7. A pipe or culvert comprising body-sections having flanged longitudinal edges, clips or bars which engage the flanges of adjacent body-sections and connect the same with each other, and bands which extend around the pipe or culvert, at intervals along the length of the latter, said bands having webs formed with apertures to accommodate the clips or bars and flanges to engage the outer surfaces of the latter.

8. A pipe or culvert comprising body-sections having flanged longitudinal edges, clips or bars which engage the flanges of adjacent body-sections and connect the same with each other, one or more of said clips or bars having welding projections, and bands which extend around the pipe or culvert, at intervals along the length of the latter, and engage said clips or bars and are integrally united to those of the latter which have welding projections.

9. A pipe or culvert comprising body-sections having flanged longitudinal edges, clips or bars which engage the flanges of adjacent body-sections and connect the same with each other, one or more of said clips or bars having welding projections, and bands which extend around the pipe or culvert, at intervals along the length of the latter, said bands having webs formed with apertures to accommodate the clips or bars and flanges which engage the outer surfaces of the latter and are integrally united to those of the same which have welding projections.

10. A pipe or culvert comprising body-sections having inwardly-turned longitudinal flanges with reverted ends, clips or bars which engage the reverted ends of adjacent flanges and connect adjacent body-sections with each other and bands which extend around the pipe or culvert, at intervals along the length of the latter, and overlie the clips or bars.

11. A pipe or culvert comprising body-sections having inwardly-turned longitudinal flanges with reverted ends, clips or bars which engage the reverted ends of adjacent flanges and connect adjacent body-sections with each other and bands which extend around the pipe or culvert, at intervals along the length of the latter, and engage the outer surfaces of the body-sections and clips or bars and are secured to the latter by electric welds.

In witness whereof I have hereunto set my hand at the city, county and State of New York, this 24th day of February, 1911.

MAURICE LACHMAN.

In presence of—
JOHN J. RANAGAN,
AGNES C. O'CONNELL.